US009771693B2

(12) United States Patent
Zhang et al.

(10) Patent No.: US 9,771,693 B2
(45) Date of Patent: Sep. 26, 2017

(54) HIGH-SOUND-ABSORPTION COMPOSITE MATERIAL FOR TRAFFIC SOUND BARRIERS AND PREPARATION METHOD THEREOF

(71) Applicant: PANASIAN MICROVENT TECH (JIANGSU) CORPORATION, Changzhou, Jiangsu (CN)

(72) Inventors: Yun Zhang, Jiangsu (CN); Ronghua Ding, Jiangsu (CN)

(73) Assignee: PANASIAN MICROVENT TECH (JIANGSU) CORPORATION, Changzhou (CN)

( * ) Notice: Subject to any disclaimer, the term of this patent is extended or adjusted under 35 U.S.C. 154(b) by 0 days.

(21) Appl. No.: 15/063,530

(22) Filed: Mar. 8, 2016

(65) Prior Publication Data

US 2016/0186395 A1 Jun. 30, 2016

Related U.S. Application Data

(63) Continuation of application No. PCT/CN2014/077160, filed on May 9, 2014.

(30) Foreign Application Priority Data

Sep. 25, 2013 (CN) .......................... 2013 1 0441132

(51) Int. Cl.
*E01F 8/00* (2006.01)
*G10K 11/162* (2006.01)
(Continued)

(52) U.S. Cl.
CPC ............ *E01F 8/0029* (2013.01); *B29C 44/02* (2013.01); *B29C 65/50* (2013.01); *G10K 11/168* (2013.01);
(Continued)

(58) Field of Classification Search
CPC ..... E01F 8/0005; E01F 8/0029; E01F 8/0064; E01F 8/007; E01F 8/0082; G10K 11/168;
(Continued)

(56) References Cited

U.S. PATENT DOCUMENTS 5,304,415 A * 4/1994 Kurihara ................... B32B 5/30
181/284
8,663,530 B2 * 3/2014 Horie .................. B29C 47/0021
181/185
(Continued)

FOREIGN PATENT DOCUMENTS

CN 2797477 * 7/2006
CN 2797477 Y 7/2006
(Continued)

OTHER PUBLICATIONS

Wanfeng Lin et al., Test on Acoustic Resonance Characteristic of PTFE Micro-Aperture Membrane, Polymer Materials Science & Engineering, May 31, 2010, pp. 115-118, vol. 26, No. 5.
(Continued)

*Primary Examiner* — Edgardo San Martin

(57) ABSTRACT

The present invention discloses a high-sound-absorption composite material for a traffic sound barrier. The surface of a porous sound-absorption material layer is clad with a cladding layer in a sealing way, and the clad parts and joints are in sealed connection. The cladding layer is an expanded polytetrafluoroethylene microporous membrane or a modified membrane of the expanded polytetrafluoroethylene microporous membrane. A preparation method is disclosed, comprising the following steps of cutting the porous sound-absorption material; covering the surface of the porous sound-absorption material with the expanded polytetrafluoroethylene microporous membrane or the modified membrane of the expanded polytetrafluoroethylene microporous membrane; performing sealed connection on the clad parts
(Continued)

and joints. By the above approach, the present invention is able to greatly reduce noise, has a soundproof function and a better sound-absorption function, has a prolonged service life, and features environmental protection, flame retardancy, damp-proofing and high plasticity.

5 Claims, 1 Drawing Sheet

(51) Int. Cl.
*B29C 44/02* (2006.01)
*B29C 65/50* (2006.01)
*G10K 11/168* (2006.01)
*G10K 11/16* (2006.01)
*B29K 27/18* (2006.01)
*B29K 105/04* (2006.01)
*B29L 31/00* (2006.01)
*B29C 44/56* (2006.01)

(52) U.S. Cl.
CPC ........ *B29C 44/569* (2013.01); *B29C 44/5627* (2013.01); *B29K 2027/18* (2013.01); *B29K 2105/04* (2013.01); *B29K 2105/041* (2013.01); *B29K 2995/0002* (2013.01); *B29L 2031/721* (2013.01)

(58) Field of Classification Search
CPC ... G10K 11/162; B29C 65/50; B29K 2027/18
USPC .......................... 181/290, 291, 294, 296, 210
See application file for complete search history.

(56) References Cited

U.S. PATENT DOCUMENTS

| | | | | |
|---|---|---|---|---|
| 8,789,651 B2* | 7/2014 | Kawai | ................ | G10K 11/168 181/284 |
| 9,218,800 B2* | 12/2015 | Kawakami | ............... | D04H 1/46 |
| 2004/0077247 A1* | 4/2004 | Schmidt | .................... | B32B 5/26 442/382 |
| 2008/0131683 A1* | 6/2008 | Ristic-Lehmann | ......... | A41D 19/01529 428/292.1 |
| 2009/0197091 A1* | 8/2009 | Kirk, II | .................... | B32B 7/12 428/422 |
| 2010/0083417 A1* | 4/2010 | Alder | ........................ | B32B 5/22 2/69 |
| 2014/0216847 A1* | 8/2014 | Blinkhorn | ................. | B32B 5/26 181/294 |
| 2015/0000674 A1* | 1/2015 | Barthe | ..................... | A61B 3/00 128/847 |
| 2015/0053502 A1* | 2/2015 | Danner | ................. | E01F 8/0023 181/284 |
| 2016/0121588 A1* | 5/2016 | Zhang | ..................... | B32B 5/022 428/421 |
| 2016/0325235 A1* | 11/2016 | Uchiyama | .............. | B01D 39/16 |

FOREIGN PATENT DOCUMENTS

| | | | | |
|---|---|---|---|---|
| CN | 201125368 Y | | 10/2008 | |
| CN | 103177719 | * | 6/2013 | .......... G10K 11/168 |
| CN | 103177719 A | | 6/2013 | |
| CN | EP 3025861 A1 | * | 6/2016 | ............ B32B 5/022 |
| DE | 102012204287 A1 | | 1/2013 | |

OTHER PUBLICATIONS

Hongrong Shi et al., Research progress of acoustic design of modern stadium, Acoustics Technology, Dec. 31, 2009, pp. 120-122, vol. 28, No. 6.
International Search Report of PCT Patent Application No. PCT/CN2014/077160 issued on Sep. 10, 2014.

* cited by examiner

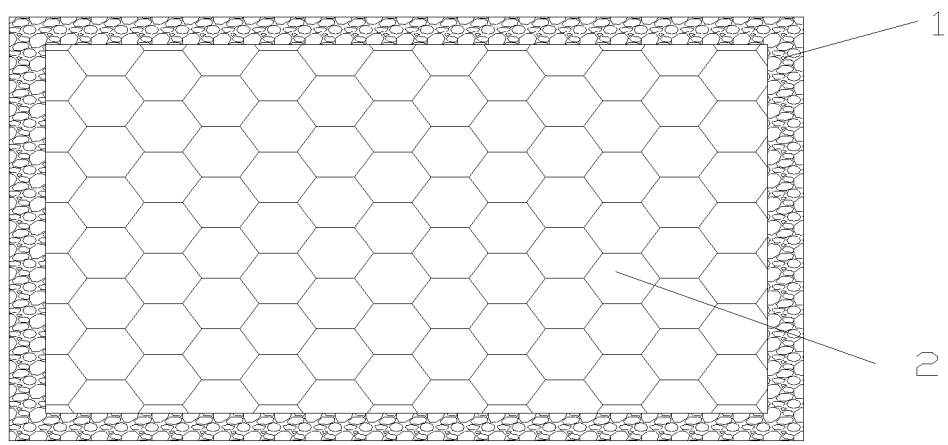

HIGH-SOUND-ABSORPTION COMPOSITE MATERIAL FOR TRAFFIC SOUND BARRIERS AND PREPARATION METHOD THEREOF

CROSS REFERENCE TO RELATED APPLICATIONS

The present application is a Continuation Application of PCT application No. PCT/CN2014/077160 filed on May 9, 2014, which claims the benefit of Chinese Patent Application No. 201310441132.3 filed on Sep. 25, 2013. All the above are hereby incorporated by reference.

BACKGROUND OF THE INVENTION

Technical Field

The present invention relates to a high-sound-absorption composite material based on an expanded polytetrafluoroethylene microporous membrane and the modified membrane thereof coated on the surface for the traffic sound barrier and a preparation method thereof.

Description of Related Art

In the design of sound barriers, wind load on viaducts, expressways, urban light rail and metros, the collision safety of traffic vehicles and all-weather outdoor corrosion resistance have been taken into full consideration. The sound barrier with a good-looking appearance has a long service life and is a universal sound isolation and reduction facility in modern cities. Sound waves generate reflection, transmission and diffraction when reaching a sound barrier during spreading. The sound barrier with a height in the range of 1 m-5 m achieves an average noise reduction of 10-15 dB (A) (125 Hz-40,000 Hz, 1/3 octave) in an effective area. The noise source of the high speed rail or metro or expressway reaches approximately 100 dB when a high-speed train runs at a speed of 250-350 KM/H or when an overhead highway bears a large traffic flow. The noises reduced and isolated by the sound barrier still reach 85 dB within 100 m of the sound source, failing to reach the limit in the environmental noises, 60-75 dB, which does not affect working and living.

However, various organic or inorganic fibers with a fiber aggregate structure and products thereof, porous-holed foamed plastics and expanded perlite products, glass wool and mineral wool with a great amount of mutually-connected open micropores or various sound-absorption plates or sound-absorption components mainly from the mentioned glass wool and mineral wool are not resistant to the outdoor environmental climate; in particular, the outdoor ultraviolet radiation speeds up aging of the above mentioned materials and shortens their service life; after three years, those materials are aged to be cracking or powdery, losing the sound-absorption function and damaging the good-looking appearance. Thus, the application of the above mentioned materials in the sound barrier project is limited.

BRIEF SUMMARY OF THE INVENTION

The present invention mainly solves the technical problem of providing a high-sound-absorption composite material for a traffic sound barrier and a preparation method thereof, so the traffic sound barrier has a sound isolation function and a better sound-absorption function, and greatly reduces the noises of the viaducts, expressways, urban light rails and metros to 60~75 dB, which is the limit in the environment noises for working and living.

To solve the above technical problem, the present invention employs the following technical solution: A high-sound-absorption composite material for a traffic sound barrier is provided including a porous sound-absorption material layer and a cladding layer; the surface of the porous sound-absorption material layer is clad with the cladding layer in a sealing way, while the clad parts and joints are in sealed connection; and the cladding layer is an expanded polytetrafluoroethylene microporous membrane or a modified membrane of the expanded polytetrafluoroethylene microporous membrane.

In a preferable embodiment of the present invention, the porous sound-absorption material layer is fiber with a fiber aggregate structure or products thereof, porous foamed plastics, expanded perlite products, microporous glass wool, mineral wool or various sound-absorption plates or sound-absorption components mainly from the above mentioned materials.

In a preferable embodiment of the present invention, sealed connection includes honing, splicing or welding.

In a preferable embodiment of the present invention, the high-sound-absorption composite material is disposed on the surface of a sound barrier or in an interlayer of a porous barrier.

To solve the above technical problem, the present invention employs another technical solution, a preparation method of the high-sound-absorption composite material for the traffic sound barrier is provided, including the following steps:

a) the porous sound-absorption material and the expanded polytetrafluoroethylene microporous membrane or the modified membrane of the expanded polytetrafluoroethylene microporous membrane are prepared before processing;

b) the porous sound-absorption materials are cut;

c) the surface of the porous sound-absorption material is clad with the expanded polytetrafluoroethylene microporous membrane or the modified membrane of the expanded polytetrafluoroethylene microporous membrane;

d) sealed connection on the clad parts and joints is carried out;

e) the composite materials are tested after the above steps are completed, and the qualified composite material is packaged.

In a preferable embodiment of the present invention, after step b) is completed, the cut porous sound-absorption materials are spliced with adhesive tapes upon process demands.

In a preferable embodiment of the present invention, the porous sound-absorption material layer is fiber with a fiber aggregate structure or products thereof, porous foamed plastics, expanded perlite products, microporous glass wool, mineral wool or various sound-absorption plates or sound-absorption components mainly from the above mentioned materials.

In a preferable embodiment of the present invention, in step d) the sealed connection includes honing, splicing or welding.

In a preferable embodiment of the present invention, the modified membrane of the expanded polytetrafluoroethylene microporous membrane is of one or more oil-repelling and water-repelling coatings applied to the surface of the expanded polytetrafluoroethylene microporous membrane.

In a preferable embodiment of the present invention, the modified membrane of the expanded polytetrafluoroethylene microporous membrane is of oil-repelling and water-repelling coatings uniformly applied to the top and bottom surfaces of the expanded polytetrafluoroethylene microporous membrane.

The present invention has the following beneficial effects:

1) The high-sound-absorption composite material for the traffic sound barrier of the present invention can greatly reduce noises and when such material is used in combination with the modern traffic sound barrier technologies, the traffic sound barrier has the sound isolation function and better sound-absorption function. The traffic sound barrier greatly reduces the noises of the viaducts, expressways, urban light rail and metros to 60~75 dB, which is the limit in the environment noises for working and living.

2) The high-sound-absorption composite material for the traffic sound barrier is resistant to outdoor weather and ultraviolet aging, and has a service life longer than that of the current sound barriers.

3) Environmental-friendliness: by using the high-sound-absorption composite material for the traffic sound barrier, various organic or inorganic fibers with a fiber aggregate structure and products thereof, porous-holed foamed plastics and expanded perlite products, glass wool and mineral wool with a great amount of mutually-connected open micropores or various sound-absorption plates or sound-absorption components mainly from the mentioned glass wool and mineral wool are environmentally-friendly.

4) Fire retardancy: the composite material with high acoustic absorptivity for the traffic barrier is of high fire retardancy.

5) Damp-proofing: the composite material with high acoustic absorptivity for the traffic barrier is highly waterproof, does no seep water, grow mold and bacteria, generate rotten and terrible smell, and ensure long-term stability.

6) Plasticity: the composite material with high acoustic absorptivity for the traffic barrier is conveniently and simply manufactured, applicable to spaces of difference sizes or closed space, makes product design diversified, is very light, and easy to install.

BRIEF DESCRIPTION OF THE SEVERAL VIEWS OF THE DRAWINGS

To more clearly describe the technical solution in the embodiments of the present invention, the following are brief introduction of the attached drawings used to describe the technology in the embodiments. Obviously, the attached drawings described below only involve some embodiments of the present invention. For those originally skilled in this field, other drawings can be made according to those drawings without creative labor.

FIG. 1 is a structural view of a preferable embodiment of the high-sound-absorption composite material for the traffic sound barrier.

Marks of components in the drawings are as follows: 1. porous sound-absorption material layer; 2. cladding layer.

DETAILED DESCRIPTION OF THE INVENTION

The technical solution in embodiments of the present invention is clearly and completely described below. Obviously, the described embodiments are only a part of embodiments in the present invention, not all the embodiments of the present invention. Based on the embodiments in the present invention, those ordinarily skilled in this field can obtain other embodiments without creative labor, which all shall fall within the protective scope of the present invention.

Refer to FIG. 1, an embodiment of the present invention includes:

A high-sound-absorption composite material for a traffic sound barrier includes a porous sound-absorption material layer 1 and a cladding layer 2; the surface of the porous sound-absorption material layer 1 is sealed and clad with the cladding layer 2, with clad parts and joints in sealed connection; and the cladding layer 2 is an expanded polytetrafluoroethylene microporous membrane or a modified membrane of the expanded polytetrafluoroethylene microporous membrane.

Expanded polytetrafluoroethylene microporous membrane: polytetrafluoroethylene (PTFE) waterproof microprous membrane is manufactured by dual stretching using a special process, with a thickness of approximately 10~200μm, a porosity of 80~96%, an average aperture of 0.01~25 μm, approximately 1/5,000-1/20,000 of a water drop and 700 times greater than the water vapour molecule. The membrane surface has up to billions of open micrpores in each square inch, and the diameter of each micropore is hundreds of times that of an air molecule. By using such microporous structure, an excellent waterproof function can be achieved. Besides, the micropores are extremely tiny and irregularly arrayed in a bending and staggering way in the longitudinal direction, and the material has a great amount of mutually-connected open micropores and thereof has the sound-absorption function.

The expanded polytetrafluoroethylene microporous membrane has high resistance to the outdoor environmental climate, high heat stability and a wide temperature application range, and can continue to work in a range of −150° C. to +260° C. With a melting point up to 327° C., the expanded polytetrafluoroethylene microporous membrane is inflammable, outstanding chemical stability, acid resistance and alkali resistance, a small friction coefficient and high hydrophobicity, can be used as many high-corrosive-resistant media, and endure outdoor ultraviolet radiation for more than 20 years without aging.

The porous sound-absorption material layer 1 is fiber with a fiber aggregate structure or products thereof, porous foamed plastics, expanded perlite products, microporous glass wool, mineral wool or various sound-absorption plates or sound-absorption component mainly from the above mentioned materials. Sealed connection on the clad parts and joints includes honing, splicing or welding, for the purpose of ensuring no seepage of rain water.

The sound absorption mechanism of the porous sound-absorption material is that the sound wave causes air vibration in the holes when entering the porous material. Due to the friction and the air viscous resistance, one part of the sound energy is converted into heat energy; besides, heat transfer among the air in the holes and the hole walls and fibers also causes heat loss, attenuating the sound energy and reducing the noise level.

The high-sound-absorption composite material is disposed on the surface of a sound barrier or in an interlayer of a porous barrier, so the traffic sound barrier has the sound isolation function and better sound-absorption function. The traffic sound barrier greatly reduces the noises of the viaducts, expressways, urban light rail and metros to 60~75 dB, which is the limit in the environment noises for working and living.

Embodiment 1: A preparation method of the high-sound-absorption composite material for the traffic sound barrier includes the following steps:

a) porous sound-absorption materials and the modified membrane of the expanded polytetrafluoroethylene microporous membrane are prepared before processing;

b) the porous sound-absorption material is cut; after cutting, the cut porous sound-absorption materials are spliced with adhesive tapes upon process demands.

c) the surface of the porous sound-absorption material is clad with the modified membrane of the expanded polytetrafluoroethylene microporous membrane;

d) sealed connection on the clad parts and joints is carried out, and the connection modes include honing, splicing and welding.

e) the composite material are tested after the above steps are completed, and the qualified composite material is packaged.

The porous sound-absorption material may be various organic or inorganic fibers with a fiber aggregate structure and products thereof, porous-holed foamed plastics and expanded perlite products, glass wool and mineral wool with a great amount of mutually-connected open micropores or various sound-absorption plates or sound-absorption components mainly from the mentioned glass wool and mineral wool.

Wherein, the preparation process of the expanded polytetrafluoroethylene microporous membrane includes the following steps:

a) polytetrafluoroethylene dispersing resin and a liquid adjuvant are mixed by a ratio;

b) after the mixing is completed, the mixture is pressed into a cylinder blanks; the cylinder blanks are rolled to thin sheets by using a rolling process, and the thin sheets are reeled;

c) the thin sheets are unreeled, sent to pass a drying channel to remove the adjuvant;

d) after the adjuvant is removed, the thin sheets are stretched into microporous fibres; the microporous fibres undergo the thermal setting and then are reeled;

e) after the above steps are completed, the materials are tested and packaged to obtain the expanded polytetrafluoroethylene microporous membrane.

Embodiment 2: A preparation method of the high-sound-absorption composite material for the traffic sound barrier includes the following steps:

a) porous sound-absorption materials and the modified membrane of the expanded polytetrafluoroethylene microporous membrane are prepared before processing;

b) the porous sound-absorption material is cut; after cutting, the cut porous sound-absorption materials are spliced with adhesive tapes upon process demands.

c) the surface of the porous sound-absorbing material is clad with the modified membrane of the expanded polytetrafluoroethylene microporous membrane;

d) sealed connection on the clad parts and joints is carried out, and the connection modes include honing, splicing and welding.

e) the composite materials are tested after the above steps are completed, and the qualified composite material is packaged.

The porous sound-absorption material may be various organic or inorganic fibers with a fiber aggregate structure and products thereof, porous-holed foamed plastics and expanded perlite products, glass wool and mineral wool with a great amount of mutually-connected open micropores or various sound-absorption plates or sound-absorption components mainly from the mentioned glass wool and mineral wool.

The modified membrane of the expanded polytetrafluoroethylene microporous membrane is of one or more oil-repelling and water-repelling coatings applied to the surface of the expanded polytetrafluoroethylene microporous membrane, or the modified membrane of the expanded polytetrafluoroethylene microporous membrane is of oil-repelling and water-repelling coatings uniformly applied to the top and bottom surfaces of the expanded polytetrafluoroethylene microporous membrane.

The process of the oil-repelling and water-repelling surface modification treatment on the expanded polytetrafluoroethylene microporous membrane is as follows. First, the expanded polytetrafluoroethylene microporous membrane is unreeled; the water-repelling agent is sprayed to the membrane surface; then the membrane is oven dried at a low temperature; next, the oil-repelling agent is sprayed on the membrane surface; the membrane is oven dried again; finally, the membrane is inspected and the qualified membrane is reeled and stored.

The present invention has the following beneficial effects:

1) The high-sound-absorption composite material for the traffic sound barrier of the present invention can greatly reduce noise, and when such material is used in combination with the modern traffic sound barrier technologies, the traffic sound barrier has the sound isolation function and better sound-absorption function. The traffic sound barrier greatly reduces the noises of the viaducts, expressways, urban light rails and metros to 60~75 dB, which is the limit in the environment noises for working and living.

2) The high-sound-absorption composite material for the traffic sound barrier is resistant to the outdoor weather and ultraviolet aging, and has a service life longer than that of the current sound barriers.

3) Environmental-friendliness: by using the high-sound-absorption composite material for the traffic sound barrier, various organic or inorganic fibers with a fiber aggregate structure and products thereof, porous-holed foamed plastics and expanded perlite products, glass wool and mineral wool with a great amount of mutually-connected open micropores or various sound-absorption plates or sound-absorption components mainly from the mentioned glass wool and mineral wool are environmentally-friendly.

4) Fire retardancy: the high-sound-absorption composite material for the traffic barrier is of high fire retardancy.

5) Damp-proofing: the high-sound-absorption composite material for the traffic barrier is highly waterproof, does no seep water, grow mold and bacteria, generate rotten and terrible smell, and ensure long-term stability.

6) Plasticity: the high-sound-absorption composite material for the traffic barrier is conveniently and simply manufactured, applicable to spaces of difference sizes or closed space, makes product design diversified, is very light, and easy to install.

The above are only some embodiments of the present invention and shall not be regarded as limit to the present invention. Any equivalent structure or equivalent flow modifications made on the basis of the description of the present invention, or director or indirect application to other related fields, shall fall within the protective scope of the present invention.

What is claimed is:

1. A preparation method of a high-sound-absorption composite material for a traffic sound barrier, comprising the following steps:

a) preparing porous sound-absorption materials and an expanded polytetrafluoroethylene microporous membrane or a modified membrane of the expanded polytetrafluoroethylene microporous membrane before processing;

b) cutting the porous sound-absorption materials;

c) cladding the surface of the porous sound-absorption material with the expanded polytetrafluoroethylene microporous membrane or the modified membrane of the expanded polytetrafluoroethylene microporous membrane;

d) performing sealed connection on clad parts and joints; and e) testing the composite material after completing the above steps, and packaging the qualified composite material;

wherein, after step b) is completed, the cut porous sound-absorption materials are spliced with adhesive tape upon process demands.

2. The preparation method of the high-sound-absorption composite material for the traffic sound barrier according to claim 1, wherein the porous sound-absorption material layer is fiber with a fiber aggregate structure or products thereof, porous foamed plastics, expanded perlite products, microporous glass wool, mineral wool or various sound-absorption plates or sound-absorption components mainly from the above mentioned materials.

3. The preparation method of the high-sound-absorption composite material for the traffic sound barrier according to claim 1, wherein, in step d) the sealed connection modes comprise honing, splicing and welding.

4. The preparation method of the high-sound-absorption composite material for the traffic sound barrier according to claim 1, wherein the modified membrane of the expanded polytetrafluoroethylene microporous membrane is of one or more oil-repelling and water-repelling coatings applied to the surface of the expanded polytetrafluoroethylene microporous membrane.

5. The preparation method of the high-sound-absorption composite material for the traffic sound barrier according to claim 1, wherein the modified membrane of the expanded polytetrafluoroethylene microporous membrane is of oil-repelling and water-repelling coatings uniformly applied to both top and bottom surfaces of the expanded polytetrafluoroethylene microporous membrane.

\* \* \* \* \*